United States Patent [19]

Watanabe et al.

[11] Patent Number: 5,317,066

[45] Date of Patent: May 31, 1994

[54] POLYESTER-GRAFTED POLYAMIDE, PROCESS FOR PREPARING THE SAME, AND THERMOPLASTIC RESIN COMPOSITION CONTAINING THE SAME

[75] Inventors: Kazushi Watanabe, Ohtake; Katsuhiko Sumida, Himeji, both of Japan

[73] Assignee: Daicel Chemical Industries, Ltd., Osaka, Japan

[21] Appl. No.: 36,071

[22] Filed: Mar. 23, 1993

Related U.S. Application Data

[63] Continuation-in-part of Ser. No. 835,421, Feb. 19, 1992, abandoned.

[51] Int. Cl.$^5$ .................. C08L 77/06; C08L 77/12
[52] U.S. Cl. ......................... 525/425; 525/419
[58] Field of Search .................. 525/425, 419

[56] References Cited

U.S. PATENT DOCUMENTS

| | | | |
|---|---|---|---|
| 4,115,475 | 9/1978 | Foy | 525/425 |
| 4,391,956 | 7/1983 | Scheetz | 525/425 |
| 4,985,508 | 1/1991 | Mussioj | 525/420.5 |

FOREIGN PATENT DOCUMENTS

| | | |
|---|---|---|
| 2307895 | 2/1973 | Fed. Rep. of Germany . |
| 48303 | 3/1983 | Japan . |
| 3170455 | 7/1988 | Japan . |

Primary Examiner—James J. Seidleck
Assistant Examiner—I. Zemel
Attorney, Agent, or Firm—Flynn, Thiel, Boutell & Tanis

[57] ABSTRACT

The polyester-grafted polyamide of the present invention comprises a polyamide as the backbone and a thermoplastic polyester as the graft and has a number-average molecular weight in terms of standard polymethyl methacrylate of 50,000 to 500,000 as determined by gel permeation chromatography using 1,1,1,3,3,3-hexafluoro-2-propanol. The polyester-grafted polyamide is useful as a modifier for polyesters and polyamides.

4 Claims, 6 Drawing Sheets

FIG. I

¹H-NMR of PBT-g-nylon 6 polymer (1)

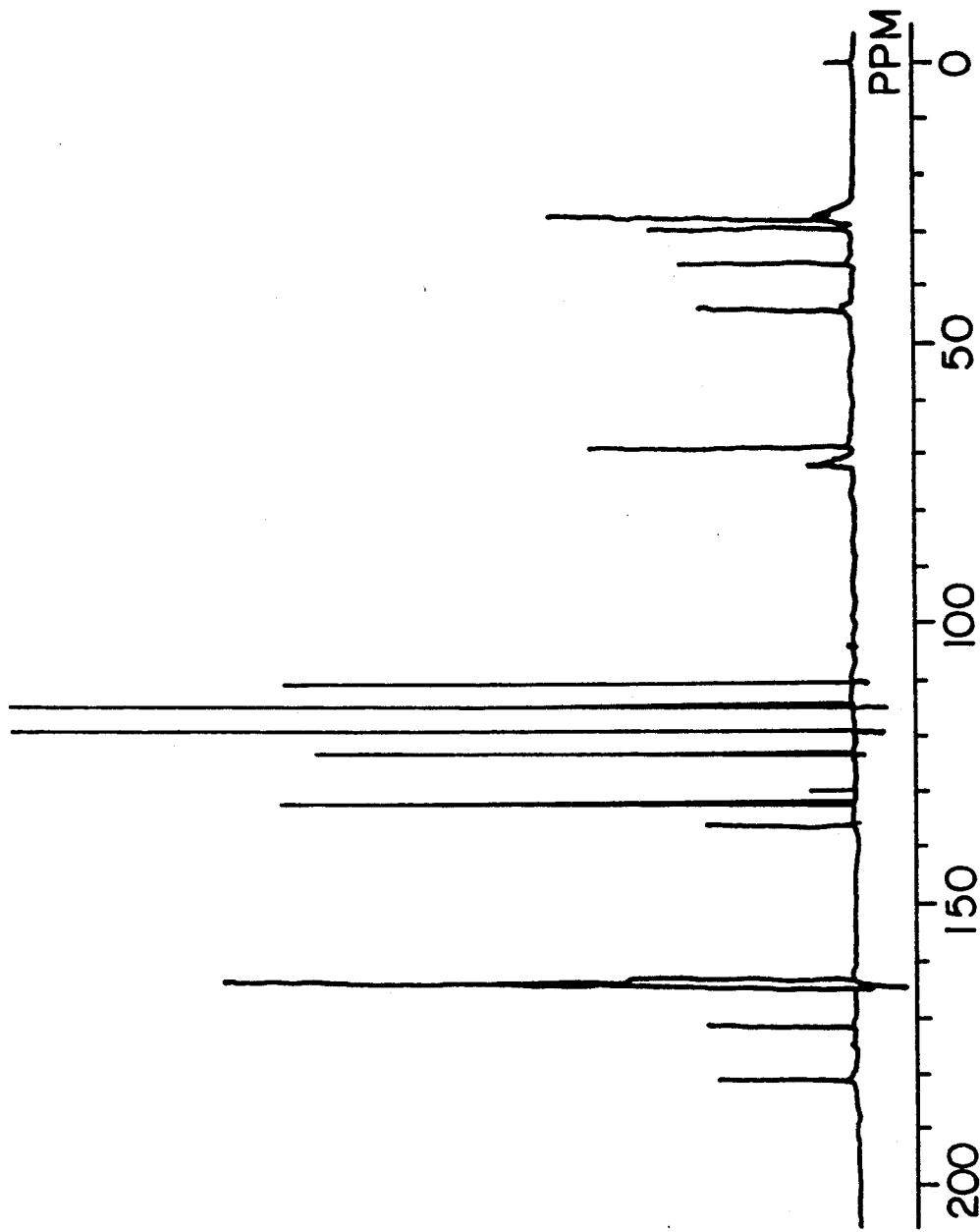
FIG. 3 $^{13}$C-NMR of PBT-g-nylon 6 polymer (1)

Gel permeation chromatogram

PET-g-nylon 66 polymer

EOA Ny-66

FIG. 5a
DSC curve
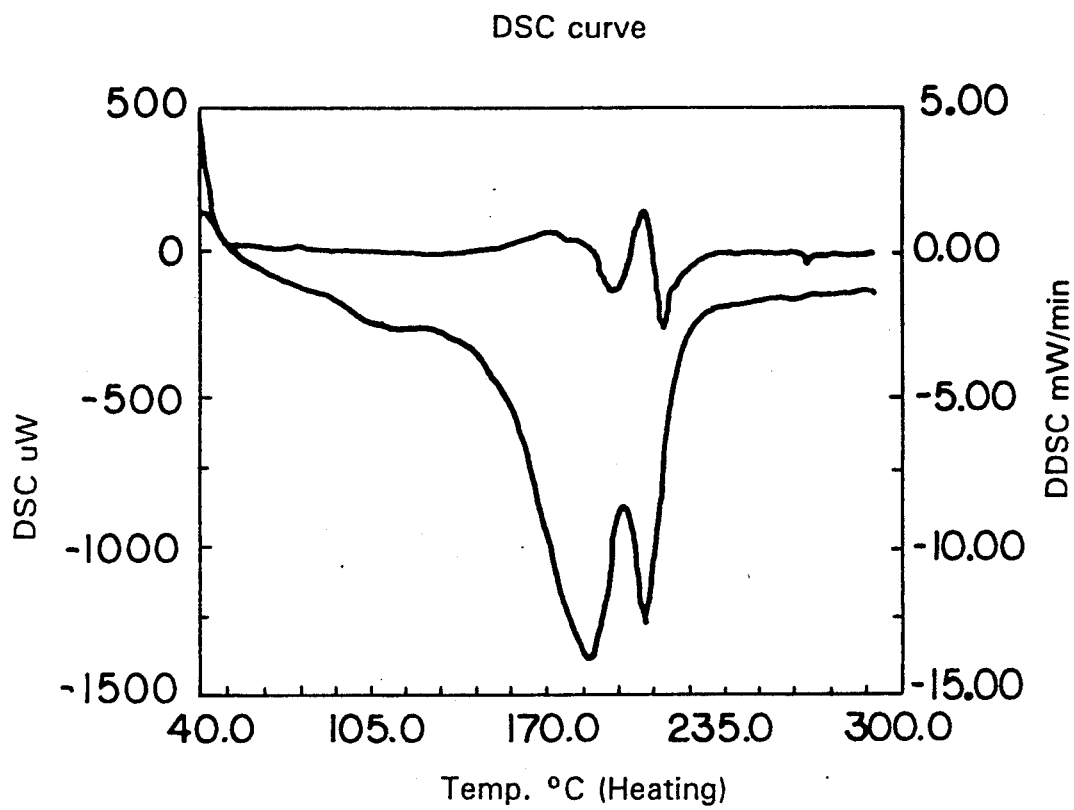
FIG. 5b  PBT-g-nylon 6 polymer (1)
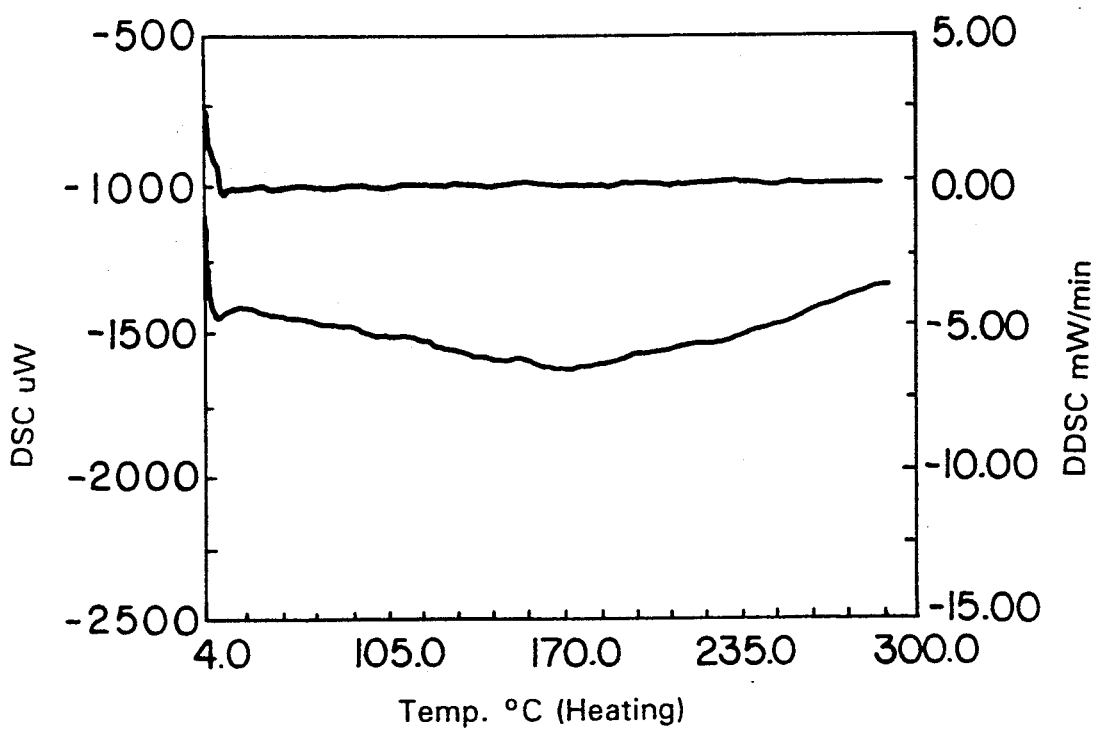
FIG. 5b  PBT-g-nylon 6 polymer (2)

Wide-angle X-ray diffraction peaks

20°C/min

80°C/min

POLYESTER-GRAFTED POLYAMIDE, PROCESS FOR PREPARING THE SAME, AND THERMOPLASTIC RESIN COMPOSITION CONTAINING THE SAME

This application is a continuation-in-part of U.S. application Ser. No. 07/835 421, filed Feb. 19, 1992, now abandoned.

FIELD OF INDUSTRIAL APPLICATION

The present invention relates to a novel graft polymer, a process for preparing the same and a thermoplastic resin composition containing the same.

More particularly, the present invention relates to a novel graft polymer useful as a modifier or compatibilizing agent for thermoplastic polyester, polyamide resin and the like which are used for fibers and molding materials and exhibit excellent performances, a process for preparing the same, and a thermoplastic polyester and-/or polyamide resin composition which is improved by the addition of the same and therefore is highly valuable as a thermoplastic material.

PRIOR ART

A polyamide resin exhibits excellent strengths, toughness and heat resistance and has been widely used as fiber, molding material and so on. However, it has a disadvantage that it tends to absorb water to cause dimensional change and lowering in the mechanical properties. Further, a crystalline polyamide resin has another disadvantage of significantly shrinking during the cooling after melt molding to give a molded article suffering from dimensional distortion or warpage.

Owing to these disadvantages, the marketability of a polyamide resin when used alone as a molding material is limited in some cases, though the resin is excellent. In order to overcome the disadvantages, a polyamide resin has been blended another thermoplastic resin, for example, a thermoplastic polyester resin which exhibits excellent strengths and heat resistance (like the polyamide resin) and is unproblematic with respect to water absorption. However, the composition prepared by the simple blending of the conventional polyamide resin with a thermoplastic polyester causes phase separation resulting in very poor mechanical properties because of the poor compatibility of the resins with each other.

Therefore, studies have been made on the preparation of a block or graft copolymer by the reaction of a polyamide resin with a thermoplastic polyester resin. For example, japanese Patent Laid-open No. 103191/1976 disclosed a process for melt-kneading polyamide together with polybutylene terephthalate and subjecting the obtained mixture to solid-phase polymerization. According to this process, however, the preparation of a block copolymer took a long time and terminal condensation partially occurred only, so that the diameter of each particle dispersed in the resulting melt blend chip was unfavorably about 10 μm. Further, Japanese Patent Laid-Open No. 198626/1989 disclosed a process for the preparation of a block copolymer composed of a polyamide segment represented by aromatic polyamide and a polyester segment represented by polyalkylene terephthalate and polyarylate. According to this process, when the polyamide segment has a low molecular weight, the obtained block copolymer comprises short segments, thus having poor compatability with a polyamide or polyester, even though the blocking rate is high by virtue of the sufficiently high concentration of the terminal aryl ester group in the reaction system. On the contrary, when the polyamide segment has a high molecular weight, the blocking rate is problematically low to form a homopolyester at a high ratio.

Further, the use of an aliphatic polyamide as the polyamide segment necessitates more sever reaction conditions and it is impossible to introduce a polyamide segment such as polyadipamide (nylon 6) by this process.

As described above, it was very difficult to form a covalent bond between a polyamide and a polyester.

DISCLOSURE OF INVENTION

The inventors of the present invention have intensively studied to solve the above problems and have found a polyester-grafted polyamide, a process for preparing the same and an excellent resin composition obtained by adding this graft polymer to a polyamide resin, a thermoplastic polyester resin, a mixture of the both, an arbitrary thermoplastic resin or a mixture of two or more thermoplastic resins. The inventors have also found that the graft polymer is extremely excellent as a compatibilizing agent or adhesive layer resin for a system comprising a polyamide and a thermoplastic polyester resin. The present invention has been accomplished on the basis of these findings.

Namely, the present invention provides 1. a polyester-grafted polyamide comprising a polyamide as the backbone and a thermoplastic polyester as the graft and having a number-average molecular weight in terms of standard polymethyl methacrylate of 50,000 to 500,000 as determined by gel permeation chromatography using 1,1,1,3,3,3-hexafluoro-2-propanol,
2. a polyester-grafted polyamide having a structure represented by the following general formula I or II:

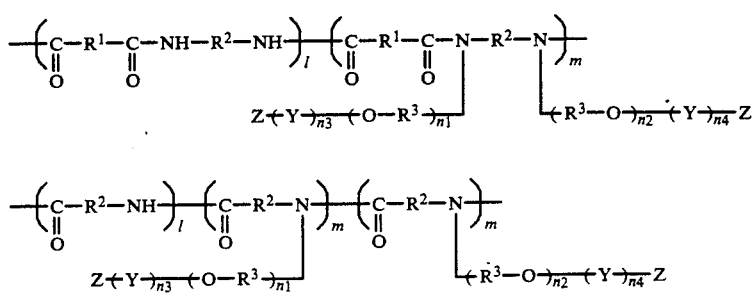

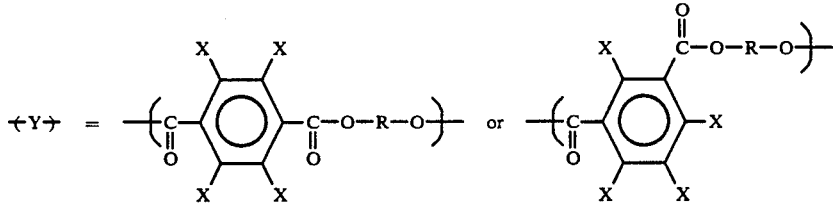

wherein X stands for a hydrogen atom, a hydrocarbon group or a halogen atom; R stands for an alkylene group having 2 to 6 carbon atoms; $R^1$ stands for an alkylene group having 4 to 8 carbon atoms or a phenylene group which may be substituted; $R^2$ stands for an alkylene group having 4 to 14 carbon atoms; $R^3$ stands for an alkylene group having 2 to 4 carbon atoms; l is a positive number of 1 to 1,000; m is a positive number of 1 to 10; $n_1$ and $n_2$ are each a positive number of 0 to 50; $n_3$ and $n_4$ are each a positive number of 0 to 500, with the proviso that the relationships represented by the formulas: $n_1 + n_2 \neq 0$ and $n_1 \times n_2 + n_2 + n_4 \neq 0$ must be satisfied; z stands for a terminal group of a thermoplastic polyester or a hydrogen atom, and having a number-average molecular weight in terms of standard polymethyl methacrylate of 50,000 to 500,000 as determined by gel permeation chromatography using 1,1,1,3,3,3-hexafluoro-2-propanol, 3. a process for preparing a polyester polyamide which comprises polymerizing at least one polyester prepolymer represented by the following general formula III or IV:

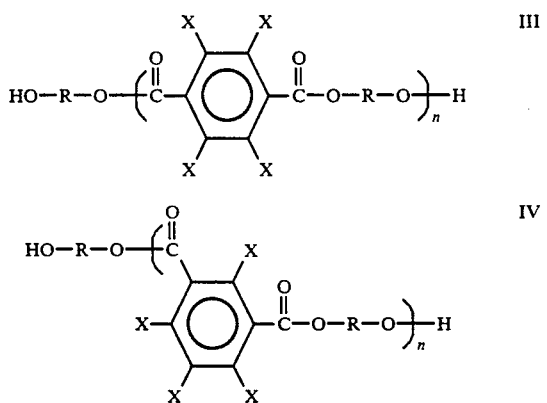

wherein X stands for a hydrogen atom, a hydrocarbon group or a halogen atom; R stands for an alkylene group having 2 to 6 carbon atoms; and n is a positive number of 1 to 200, in the presence of a hydroxylated polyamide through transesterification, 4. a process for preparing a polyester-grafted polyamide which comprises polycondensing at least one member selected from the group consisting of dibasic acids and derivatives thereof with at least one member selected from the group consisting of dihydric glycols and dihydric phenols in the presence of a hydroxylated polyamide, 5. a thermoplastic resin composition prepared by homogeneously mixing 5 to 99.5% by weight of an arbitrary thermoplastic resin or a mixture of two or more thermoplastic resins with 95 to 0.5% by weight of a polyester-grafted polyamide, and 6. a thermoplastic resin composition prepared by homogeneously mixing 5 to 99.5% by weight of a thermoplastic polyester resin, a polyamide resin or a mixture of the both with 95 to 0.5% by weight of a polyester-grafted polyamide.

The hydroxylated polyamide to be used in the present invention can be prepared by introducing a hydroxyl group into the conventional polyamide or by conducting the ring-opening polymerization of a lactam, the polycondensation of a diamine with a dicarboxylic acid or the polycondensation of an amino carboxylic acid in the presence of a monomer having a hydroxyl group or a substituent easily convertible into a hydroxyl group.

The "conventional polyamide" described above is one prepared by the ring-opening polymerization of a lactam, the polycondensation of a diamine with a dicarboxylic acid or the polycondensation of an amino carboxylic acid and examples thereof include nylon 6, nylon 66, nylon 610, nylon 612, nylon 11 and nylon 12. Further, the "conventional polyamide" includes copolymers prepared from two or more diamines and dicarboxylic acids, copolymers prepared from two or more amino carboxylic acids, and copolymers prepared from a diamine, a dicarboxylic acid, a lactam and an amino carboxylic acid. Furthermore, it includes multiblock copolymers called "polyether amide" or "polyether ester amide", which comprise polyamide and polyether segments.

As a representative process for introducing a hydroxyl group into the conventional polyamide, there has been known a process of reacting a polyamide with an alkylene oxide having 2 to 4 carbon atoms in the presence of an alkaline compound to form a β-hydroxyalkylated polyamide. Particularly, processes described in Journal of Polymer Science, 15, 427 (1955) and Japanese Patent Laid-Open No. 92223/1989 can be utilized. Representative examples of the β-hydroxyalkylated polyamide are represented by the following general formulas V and VI:

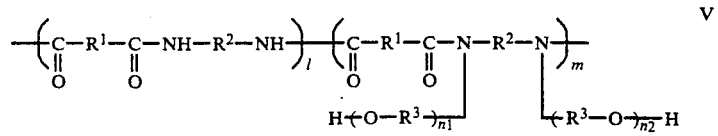

-continued

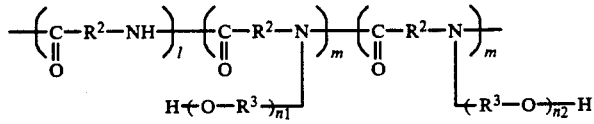

VI wherein $R^1$ stands for an alkylene group having 4 to 8 carbons atoms or a phenylene group which may be substituted; $R^2$ stands for an alkylene group having 4 to 14 carbon atoms; $R^3$ stands for an alkylene group having 2 to 4 carbon atoms; l is a positive number of 1 to 1,000; m is a positive number of 1 to 10; and $n_1$ and $n_2$ are each a positive number of 0 to 50, with the proviso that the relationship: $n_1+n_2 \neq 0$ must be satisfied.

In the general formulas V and VI, definite examples of $R^1$, $R^2$ and $R^3$ are as follows: $R^1$ is butylene group, hexylene group, octylene group, 1,3-phenylene group, 1,4-phenylene group or m-xylylene group; $R^2$ is butylene group, hexylene group, nonylene group, decylene group, undecylene group or dodecylene group; and $R^3$ is ethylene group or propylene group. If too many hydroxyl groups are present in one polyamide chain, the polyamide chains will be bonded to each other through a polyester prepolymer to give an unfavorable crosslinked polymer. Further, in the above general formulas V and VI, the ranges of l, m, n, $n_1$, $n_2$ and $n_3$ are as follows: l is a positive number of 1 to 1,000, m is a positive number of 1 to 10, and $n_1$ and $n_2$ are each a positive number of 0 to 50, and must not be 0 simultaneously. When l is below its range described above and m is above its range, the resulting polyamide chain will contain too many hydroxyl groups bonded thereto, so that an unfavorable crosslinked polymer will be formed in the grafting of a polyester onto the polyamide. When $n_1$ or $n_2$ exceeds 50, the resulting polyamide will lose the advantages inherent in the polyamide owing to the presence of too much polyalkylene oxide chain component therein.

For these reasons, as the ranges of l, m, $n_1$ and $n_2$, a case wherein l is 10 to 200, m is 1 to 2 and $n_1$ and $n_2$ are each a positive number of 0 to 10 with the proviso that the relationship: $n_1+n_2 \neq 0$ must be satisfied is most desirable from the standpoint of practical use.

Z stands for a terminal group of a thermoplastic polyester or a hydrogen atom when neither alkylene oxide segment nor thermoplastic polyester segment is present (i.e., when either the sum of $n_1$ and $n_3$ or that of $n_2$ and $n_4$ is 0).

Although the hydroxylated polyamide to be used in the present invention is not particularly limited in respect of molecular weight, it is preferable that it have a number-average molecular weight in terms of standard polymethyl methacrylate (hereinafter referred to as "molecular weight in terms of PMMA") of 30,000 to 200,000 as determined by gel permeation chromatography (hereinafter referred to as "GPC") using 1,1,1,3,3,3-hexafluoro-2-propanol (hereinafter abbreviated to "HFIP") as an eluent (which is corresponding to a number-average molecular weight of 10,000 to 40,000 as determined with 98% sulfuric acid at a polymer concentration of 1 g/100 ml at 25° C.).

Generally, the apparent number-average molecular weight of a polyamide in terms of standard polymethyl methacrylate as determined by GPC in HFIP tends to be larger than its actual molecular weight.

The polyester-grafted polyamide of the present invention has a structure comprising a hydroxylated polyamide as the backbone and a thermoplastic polyester as the graft.

In the general formulas I and II representing the polyester-grafted polyamide, definite examples of $R^1$, $R^2$ and $R^3$ are as follows: $R^1$ is butylene group, hexylene group, octylene group, 1,3-phenylene group, 1,4-phenylene group or m-xylylene group; $R^2$ is butylene group, hexylene group, nonylene group, decylene group, undecylene group or dodecylene group; and $R^3$ is ethylene group or propylene group. It is preferable that the polyalkylene oxide chain segment constituting the polyester-grafted polyamide represented by the general formula I or II be as short as possible, because only the terminal hydroxyl group of the chain segment is necessary for the reaction with a polyester prepolymer.

The number of the polyester chains to be grafted onto one polyamide chain and the molecular weight of the polyester chain may be arbitrarily selected depending upon the use of the polyester-grafted polyamide. For these reasons, in the above formulas I and II, the ranges of l, m, $n_1$, $n_2$ $n_3$ and $n_4$ are as follows: l must be 1 to 1,000; m must be 1 to 10; $n_1$ and $n_2$ must be each a positive number of 0 to 50; $n_3$ and $n_4$ must be each a positive number of 0 to 500; and the relationships: $n_1+n_2 \neq 0$ and $n_1 \times n_3 + n_2 \times n_4 \neq 0$ must be satisfied.

Particularly, a case wherein l is 10 to 200, m is 1 to 2, $n_1$ and $n_2$ are each a positive number of 0 to 10, $n_3$ and $n_4$ are each a positive number of 10 to 200; and the relationships: $n_1+n_2 \neq 0$ and $n_1 \times n_3 + n_2 \times n_4 \neq 0$ are satisfied is most desirable from the standpoint of practicality.

In the polyester-grafted polyamide according to the present invention, whether a polyester chain has been grafted onto a polyamide chain without fail or not can be judged by, for example, a method of determining the molecular weight in terms of PMMA of a product by GPC using HFIP as an eluent (which will be described in Experimental Example 1).

The molecular weight in terms of PMMA of a polyester-grafted polyamide is higher than that of the hydroxylated polyamide used as the raw material. However, the molecular weight in terms of PMMA of a polyamide in HFIP tends to be determined as if it were much higher than the actual one, so that the difference between a polyester-grafted polyamide and a hydroxylated polyamide as the raw material in molecular weight in terms of PMMA tends to become less.

This phenomenon is due to the difference in behavior between a polyamide which is thought to be present in the linear form in HFIP and a polyester-grafted polyamide which is thought to be present in the bulky form therein. Although the molecular weight of the polyester-grafted polyamide according to the present invention is not particularly limited, it is preferable that the molecular weight in terms of PMMA thereof as determined by GPC using HFIP range from 50,000 to 500,000. GPC not only serves to reveal the number-average molecular weight of the polyester-grafted polyamide, but also gives information with respect to the polyester homopolymer and oligomer which may be contained in the polyester-grafted polyamide, thus being very beneficial.

Further, the difference in properties between the polyester-grafted polyamide of the present invention and the hydroxylated polyamide used as the raw material can be also ascertained by differential scanning calorimetry (hereinafter referred to as "DSC" and will be described in Experimental Example 2) and wide-angle X-ray diffractometry (which will be described in Experimental Example 3). Although the behavior of the polyester-grafted polyamide in DSC and wide-angle X-ray diffractometry somewhat varied depending upon the chain length of the polyester grafted onto the polyamide and the number of the polyester chains grafted thereonto, the polyester-grafted polyamide became transparent and a noncrystalline state was observed, when the polyester-grafted polyamide was solidified from a molten state by cooling at a proper rate. On the other hand, when the polyamide to be used as the raw material was solidified by cooling under the same conditions, a crystalline state was observed. Thus the difference between the both in properties can be clearly ascertained.

Particularly preferable examples of the polyester-grafted polyamide according to the present invention include graft polymers which are prepared by polymerizing a polyester prepolymer represented by the following structural formula:

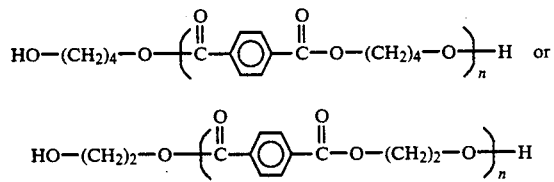

in the presence of nylon 6, nylon 66 or nylon 12 having hydroxy groups in its molecule and a molecular weight in terms of PMMA of 30,000 to 200,000 as determined by GPC using HFIP through transesterification and which have a molecular weight in terms of PMMA of 50,000 to 500,000 as determined by GPC using HFIP and give only an amorphous peak when cooled from a molten state at a constant rate of 80° C./min and subjected to wide-angle X-ray diffractometry, and in which no endothermic peak accompanying the fusion of the crystal is observed in DSC.

The polyester prepolymer to be used in the present invention is at least one compound selected from the group consisting of those represented by the above general formulas III and IV. In general formulas III and IV, definite examples of X and R are as follows: X is a hydrogen atom, methyl group, ethyl group or t-butyl group or a fluorine atom, a chlorine atom or a bromine atom; and R is ethylene group, propylene group, butylene group, neopentylene group or hexylene group.

Further, in the above general formulas III and IV, n is a positive number of 1 to 200. The use of a polyester prepolymer represented by the formula III or IV wherein n exceeds 200 is unfavorable, because such a polyester prepolymer reacts poorly with the hydroxyl group of the polyamide through transesterification. Generally, it is preferable that n range from 1 to 20.

The above polyester prepolymer can be easily prepared by reacting terephthalic acid or isophthalic acid, a ring-halogenated or -alkylated derivative thereof or a mono- or di-ester thereof with a glycol having 2 to 6 carbon atoms.

One example of the processes for preparing the polyester-grafted polyamide of the present invention comprises mixing 100 parts by weight of a hydroxylated polyamide with 0.1 to 10 parts by weight of a transesterification catalyst and 10 to 10,000 parts by weight of a polyester prepolymer in a molten state.

It is preferable that the above mixing be conducted under a reduced pressure, because the reaction proceeds more rapidly under such a condition. When the amount of the polyester prepolymer to be reacted with 100 parts by weight of a hydroxylated polyamide is smaller than 10 parts by weight, the properties of the resulting graft polymer will be little different from those of the polyamide used as the raw material. On the contrary, when it exceeds 10,000 parts by weight, the properties of the resulting graft polymer will be little different from those of a polyester formed by the homopolymerization of the fed polyester prepolymer. Further, a process characterized by synthesizing the polyester prepolymer to be grafted onto the polyamide in situ is also effective. For example, a process for preparing a polyester-grafted polyamide which comprises reacting dimethyl terephthalate with twice by mole as much a glycol such as 1,4-butanediol and 1,2-ethylene glycol in the presence of a hydroxylated polyamide by using a transesterification catalyst while removing formed methanol from the reaction system to form a polyester prepolymer and then keeping the resulting reaction mixture in a molten state under a reduced pressure to advance polymerization can be favorably employed.

To describe the reactions occurring in the preparation of the polyester-grafted polyamide, polyester prepolymer molecules are reacted with each other through transesterification with the elimination of a glycol component, by which the polymerization of the prepolymer proceeds. During this reaction, the transesterification between the polyester component and the hydroxyl group of the polyamide also occurs, by which the polyester component is grafted onto the polyamide chain. As the amount of the glycol removed from the reaction system increases, the molecular weight of the polyester component increases. Although the transesterification catalyst to be used may be the conventional one for the preparation of polyesters, titanium (IV) tetrabutoxide and stannous chloride are particularly preferably used.

Another example of the process for preparing the polyester-grafted polyamide according to the present invention comprises mixing a hydroxylated polyamide with at least one member selected from the group consisting of dibasic acids and derivatives thereof, at least one member selected from the group consisting of dihydric glycols and dihydric phenols and, if necessary, a condensation catalyst for the preparation of thermoplastic polyesters in a molten state at such a ratio as to form a thermoplastic polyester in an amount of 10 to 1,000 parts by weight per 100 parts by weight of the polyamide. When the amount of the formed thermoplastic polyester is lower than 10 parts by weight or larger than 1,000 parts by weight, based on 100 parts by weight of the polyamide, the properties of the obtained polyester-grafted polyamide will be little different from those of the polyamide or polyester unfavorably.

Specific examples of the dibasic acid to be used in the above process include terephthalic, isophthalic, and adipic acids; 2,2-bis(4-carboxyphenyl)propane; ring-alkylated or -halogenated derivative of these dibasic acids; and ester and acid halide derivatives thereof. Preferred examples thereof include dimethyl terephthalate, dimethyl isophthalate, diphenyl terephthalate, terephthaloyl dichloride and isophthaloyl dichloride.

Specific examples of the dihydric glycol to be used in the above process include aliphatic glycols having 2 to 6 carbon atoms, among which 1,2-ethylene glycol and 1,4-butanediol are preferred.

The dihydric phenol to be used in the above process may be any one used for the preparation of polyarylates or polycarbonates and specific examples thereof include 2,2-bis(4-hydroxyphenyl)propane, 2,2-bis(4-hydroxyphenyl)butane, 1,1'-bis(4-hydroxyphenyl)-p-diisopropylbenzene, and dihydroxydiphenyl; and ring-alkylated or -halogenated derivatives thereof.

The polyestergrafted polyamide can be prepared by polycondensing at least one member selected from the group consisting of dibasic acids and derivatives thereof with at least one member selected from the group consisting of dihydric glycols and dihydric phenols in the presence of a hydroxylated polyamide according to an arbitrary process, while distilling away format water, alcohol, hydrogen chloride and so on.

The thermoplastic polyester resin includes those having a skeleton formed with a glycol having 2 to 6 carbon atoms such as ethylene glycol, propylene glycol, butanediol, neopentyl glycol or hexanediol and a dicarboxylic acid such as terephthalic or isophthalic acid or a ring-halogenated or -alkylated derivative thereof. Specific examples thereof include polyethylene terephthalate, polypropylene terephthalate, polybutylene terephthalate, polyhexylene terephthalate, polyethylene naphthalate, polybutylene naphthalate and polyethylene-1,2-bis(phenoxy)ethane-4,4'-dicarboxylate; and copolyesters such as polyethylene isophthalate/terephthalate, polybutylene isophthalate/terephthalate and polybutylene terephthalate/decanedicarboxylate. Among them, polyethylene terephthalate and polybutylene terephthalate which exhibit well-balanced mechanical properties and moldability are preferably used.

The thermoplastic polyester resin to be used in the present invention also includes polyester resins called "aromatic polyesters" or "polyarylates" which are prepared by the polycondensation of a dibasic acid halide such as terephthaloyl dichloride or isophthaloyl dichloride with a dihydric phenol such as 2,2-bis(4-hydroxyphenyl)propane.

It is preferable that the thermoplastic polyester resin to be used in the present invention have a number-average molecular weight of 10,000 to 35,000.

Next, the polyamide resin to be used in the present invention includes various ones prepared by the polycondensation of a three-membered or higher lactam or an ω-amino carboxylic acid or that of a dibasic acid with a diamine. Specific examples of the polyamide resin include polymers of ε-caprolactam, aminocaproic acid, enantholactam, 7-aminoheptanoic acid and 11-aminoundecanoic acid; polymers prepared by the polycondensation of a diamine such as butanediamine, hexamethylenediamine, nonamethylenediamine, undecamethylenediamine, dodecamethylenediamine and m-xylylenediamine with a dicarboxylic acid such as terephthalic acid, isophthalic acid, adipic acid, sebacic acid, dodecanedicarboxylic acid or glutaric acid; and copolymers thereof.

More specific examples thereof include aliphatic polyamides such as nylon 46, nylon 6, nylon 66, nylon 610, nylon 11, nylon 12 and nylon 612; aromatic polyamides such as polyhexamethylene-terephthalamide, polyhexamethyleneisophthalamide and xylylene-containing polyamides; and multi-block copolymers called "polyether amide" or "polyether ester amide" which comprise polyamide and polyether segments. Among these polyamide resins, nylon 6, nylon 66 and nylon 12 are particularly preferable.

It is preferable that the polyamide resin to be used in the present invention have a number-average molecular weight of 10,000 to 35,000.

According to the present invention, 95 to 0.5 parts by weight of the polyester-grafted polyamide is homogeneously mixed with 5 to 99.5 parts by weight of a thermoplastic polyester resin, a polyamide resin or a mixture of the both.

The polyester-grafted polyamide of the present invention is well compatible with both a thermoplastic polyester resin and a polyamide resin.

When the polyester-grafted polyamide is blended with a thermoplastic polyester resin, the resulting composition is improved in toughness, resistance to hydrolysis, gloss, flow processability and impact resistance and the molded article made from the composition is free from sinkmark and warpage. Further, when it is blended with a polyamide resin, the resulting composition is improved in dimensional stability, weathering resistance, slipperiness, flow processability and acid resistance. Furthermore, the polyester-grafted polyamide exhibits excellent performances as a compatibilizing agent for a system comprising a thermoplastic polyester resin and a polyamide resin, so that the addition of a small amount of the polyester-grafted polyamide to a mixture comprising a thermoplastic polyester resin and a polyamide resin at an arbitrary ratio gives an excellent resin composition. It is improved as compared with the thermoplastic polyester resin with respect to toughness and resistance to hydrolysis and exhibits a lower water absorption than that of the polyamide resin without lowering the various excellent physical properties inherent in both the resins. When the polyester-grafted polyamide is added to a thermoplastic polyester resin, a polyamide resin or a mixture of the both at a ratio of 95% by weight or above, the resulting composition will exhibit characteristics nearly equal to those of the polyester-grafted polyamide, so that such addition is meaningless. Further, the addition of the polyester-grafted polyamide at a ratio of 0.5% by weight or below will have little effect in modifying a thermoplastic polyester resin or a polyamide resin. Further still, when the polyester-grafted polyamide is used as a compatibilizing agent for a system comprising a thermoplastic polyester resin and a polyamide resin, the use thereof at a ratio of 0.5% by weight or below will also have little effect and be unfavorable.

When the polyester-grafted polyamide is used as a compatibilizing agent, it is preferable to add it in an amount of 10 to 0.5% by weight based on entire resin composition.

When the polyester-grafted polyamide is mixed with a thermoplastic polyester resin, a polyamide resin or a mixture of the both, it is preferable that the repeating units constituting the polyester or polyamide chain of the polyester-grafted polyamide are the same as those of the thermoplastic polyester resin or the polyamide resin.

When the number-average molecular weights of the polyester chain and polyamide chain constituting the polyester-grafted polyamide are represented by "$M_{eg}$" and "$M_{ag}$", respectively, and the number-average molecular weights of the thermoplastic polyester resin and polyamide resin to be mixed with the polyester-grafted polyamide are represented by "$M_E$" and "$M_A$", respectively, it is preferable that the relationships: $0.05 \leq M_{eg}/M_E \leq 2$ and $0.1 \leq M_{ag}/M_A \leq 5$ are satisfied.

Any thermoplastic resin may be used as the thermoplastic resin or mixture of two or more of them. Specific examples thereof include not only thermoplastic polyester resin and polyamide resin which are well compatible with the polyester-grafter polyamide of the present invention; but also liquid-crystal polyarylate, polycarbonate, polyurethane, polyester elastomer, polycaprolactone, polyimide, polyamide imide, styrene-acrylonitrile copolymer (AS) and styrene-acrylonitrile-butadiene copolymer (ABS).

The thermoplastic resin composition can be easily prepared by melt-kneading the polyester-grafted polyamide together with an arbitrary thermoplastic resin and, if necessary, various additives by the conventional means, though the process for preparing thereof is not particularly limited. An extruder, Banbury mixer, supermixer, roll, kneader and the like are used as a kneader. Particularly, it is advantageous to conduct melt-kneading with an extruder at a resin temperature ranging from 180° to 350° C.

The polyester-grafted polyamide and thermoplastic resin composition according to the present invention may contain a fibrous reinforcement such as glass fiber, metal fiber, aramid fiber, ceramic fiber, carbon fiber, potassium titanate whisker and asbestos; or a powdery reinforcement such as talc, calcium carbonate, mica, clay, titanium oxide, aluminum oxide, glass flake, milled fiber, metal flake or powdered metal. Particularly, the polyester-grafted polyamide and thermoplastic resin composition according to the present invention can be remarkably improved in mechanical strengths and heat deformation temperature by adding a glass fiber of a chopped strand type in a weight ratio of the resin to the fiber of between 50:50 and 90:10.

Further, the polyester-grafted polyamide and thermoplastic resin composition according to the present invention may contain one or more additives selected from among heat stabilizer, antioxidant, light stabilizer, lubricant, pigment, flame retardant, plasticizer, and so on.

There have not been any description on the polyester-grafted polyamide prepared by grafting a thermoplastic polyester onto a hydroxylated polyamide chain through the reaction at the hydroxyl group of the polyamide or on the process for the preparation thereof. Accordingly, the above-described one will be useful as a means for modifying various polymers in future.

The polyester-grafted polyamide of the present invention serves to improve the toughness, impact resistance, gloss, antistatic properties and hydrolysis resistance of a thermoplastic polyester resin, and the dimensional stability, weathering resistance, slipperiness and acid resistance of a polyamide resin.

Further, the polyester-grafted polyamide exhibits excellent performances as a compatibilizing agent for a system comprising a thermoplastic polyester resin and a polyamide resin to give a blend which is improved not only in mechanical strengths but also in flow processability, colorability and dispersibility of additives.

Various molding materials, films and fibers extremely excellent from the standpoint of practical use can be provided by blending thermoplastic resins with the polyester-grafted polyamide.

BRIEF DESCRIPTION OF THE DRAWINGS

FIGS. 1, 2, 3, 4a, 4b, 5a, 5b, 6a and 6b all show the data of the analysis of the products obtained in Examples.

EXAMPLE

Figure 1:
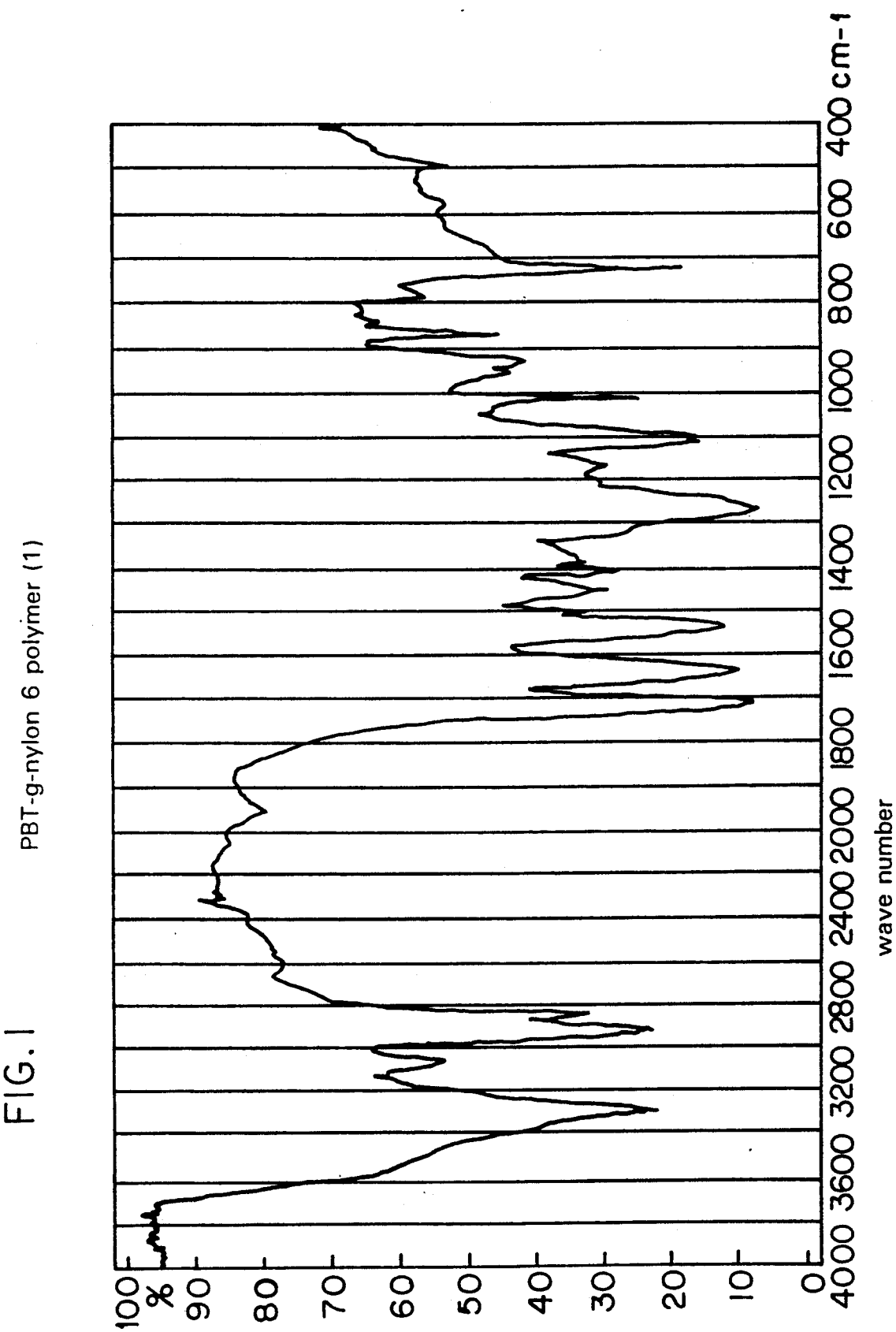

The present invention will now be described in more detail by referring to the following Examples, though the present invention is not limited to them.

In the Examples, all percentages and parts are by weight.

Further, the polyester-grafted polyamide according to the present invention will sometimes be referred to as "(polyester)-g-(polyamide) polymer". For example, polybutylene terephthalate-grafted polycaproamide will sometimes be referred to as "PBT-g-nylon 6 polymer".

Example 1 preparation of PBT-g-nylon 6 polymer (1)

β-Hydroxyalkylated polyamide (a product of Nisso Petrochemical Industry Co., Ltd., nylon 6-EOA-YIK-2S1, hereinafter abbreviated to "EOA Ny-1"), prepared by conducting the addition of 10 parts of ethylene oxide to 100 parts of nylon 6 powder (a product of Ube Industries, Ltd., Ube Nylon 6, P1022) in the presence of an alkaline compound, was used as the hydroxylated polyamide.

43.3 g of dimethyl terephthalate, 42.2 g of 1,4-butanediol, 73.5 g of EOA Ny-1 and 0.1 g of titanium (IV) tetrabutoxide as a transesterification catalyst were fed into a three-necked flask fitted with a nitrogen gas inlet tube, a thermometer and stirring rod. The contents were heated to 180° C. in a stream of nitrogen under stirring. After 2 hours, it was ascertained that a theoretical amount of methanol had been eliminated by transesterification. The reaction system was evacuated to 0.4 mmHg with a vacuum pump and heated to 240° C. to strip excess 1,4-butanediol, by which the polymerization of polybutylene terephthalate (hereinafter abbreviated to "PBT") was advanced. After 3 hours, it was ascertained that no more 1,4-butanediol was discharged. The reaction system was brought to a normal pressure to give 115 g of PBT-g-nylon 6 polymer (1).

The infrared absorption spectrum of the PBT-g-nylon 6 (1) is shown in FIG. 1. Absorption peaks assignable to the amide

group of nylon 6 were observed at 3300, 1650 and 1550 $cm^{-1}$, while an absorption peak assignable to the ester

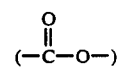

group of PBT was observed at 1720 $cm^{-1}$.

Figure 2:
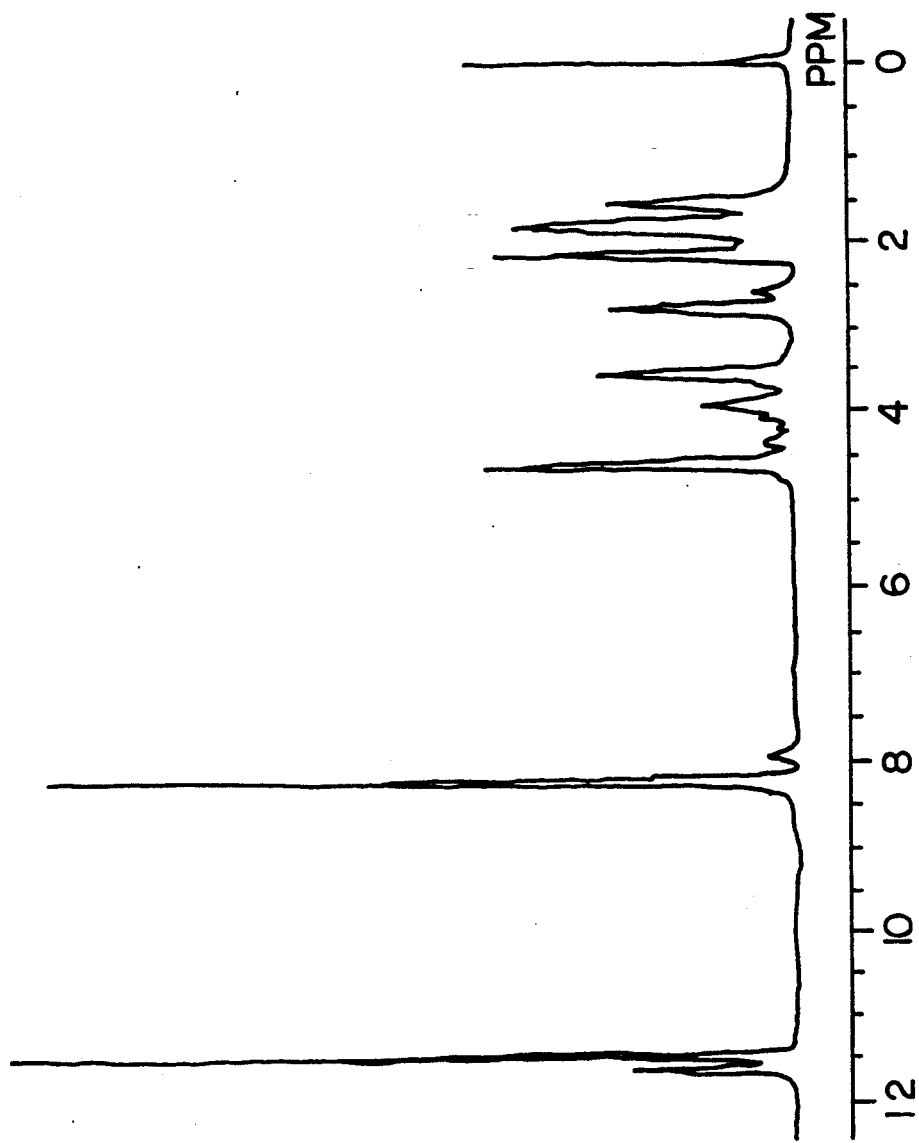

Further, the $^1H$- and $^{13}C$-nuclear magnetic resonance absorption spectra (hereinafter abbreviated to "$^1H$- and $^{13}C$-NMR") of the PBT-g-nylon 6 polymer (1) are shown in FIGS. 2 and 3, respectively. Among the peaks of the $^1$H-NMR spectrum, those assignable to PBT are observed at the δ values of 2.17(s), 4.64(s), and 8.23(s)) (in CF$_3$COOH), while the other peaks are assignable to EOA Ny-1.

Among the peaks of the $^{13}$C-NMR spectrum, those assignable to PBT are observed at the δ values of 26.47, 68.51, 131.69, 135.69 and 171.06 (in CF$_3$OOH), while the other peaks are assignable to the EOA Ny-1 except for the peak (δ: 11.5) in the $^1$H-NMR and the peaks (δ: 110.36 to 122.90 and 163.36 to 164.78) in the $^{13}$C-NMR assignable to the solvent.

Example 2 preparation of PBT-g-nylon 6 polymer (2)

β-Hydroxyalkylated polyamide (a product of Nisso Petrochemical Industry Co., Ltd., nylon 6-EOA-YIK-2S2, hereinafter abbreviated to "EOA Ny-2"), prepared by conducting the addition of 20 parts of ethylene oxide to 100 parts of the same nylon 6 powder (1022P) as that used in the Example 1 in the presence of an alkaline compound, was used as the hydroxylated polyamide.

52 g of dimethyl terephthalate, 50.6 g of 1,4-butanediol, 73.5 g of EOA Ny-2 and 0.1 g of titanium (IV) tetrabutoxide as a transesterification catalyst were fed into the same equipment that was used in Example 1. The contents were heated to 180° C. in a stream of nitrogen under stirring. After 2 hours, it was ascertained that a theoretical amount of methanol had been eliminated. The reaction system was evacuated to 1.5 mmHg with a vacuum pump and heated to 240° C. to strip excess 1,4-butanediol, by which the polymerization was advanced. After 2 hours, it was ascertained that no more 1,4-butanediol was discharged. The reaction system was brought to a normal pressure to give 125.3 g of PBT-g-nylon 6 polymer (2). The infrared absorption spectrum and $^1$H-and $^{13}$C-NMR spectra of the polymer (2) were identical with those of the PBT-g-nylon 6 polymer (1) prepared in the Example 1.

Example 3 preparation of PET-g-nylon 66 polymer

β-Hydroxyalkylated polyamide (hereinafter abbreviated to "EOA Ny-66"), prepared by the addition of 5 parts of ethylene oxide to 100 parts of a powder of nylon 66 (a product of Polyplastics Co., Ltd.; Polypla nylon 66 1000-2), was used as the hydroxylated polyamide.

58.2 g of dimethyl terephthalate, 39 g of 1,2-ethylene glycol, 70 g of EOA Ny-66 and 0.1 g of titanium (IV) tetrabutoxide as a transesterification catalyst were fed into the same equipment that was used in Example 1. The contents were heated to 180° C. in a stream of nitrogen under stirring. After 2 hours, it was ascertained that a theoretical amount of methanol had been eliminated. The reaction system was evacuated to 0.9 mmHg with a vacuum pump and heated to 270° C. After 2 hours, it was ascertained that no more 1,2-ethylene glycol was discharged. The reaction system was brought to a normal pressure to give 122.9 g of a PET-g-nylon 66 polymer.

In the infrared absorption spectrum of the PET-g-nylon 66 polymer, absorption peaks assignable to the amide group were observed at 3300, 1650 and 1550 cm$^{-1}$ and an absorption peak assignable to the ester group of polyethylene terephthalate (hereinafter abbreviated to "PET") was observed at 1725 cm$^{-1}$. Further, the PET-g-nylon 66 polymer was subjected to $^1$H- and $^{13}$C-NMR spectroscopy. In the $^1$H-NMR spectrum, the peaks (CF$_3$COOH, δ: 2.9(s) and 8.2(s)) are assignable to PET, while the others are assignable to EOA Ny-66.

In the $^{13}$C-NMR spectrum, the peaks (CF$_3$COOH, δ: 66.1, 132.0, 135.6 and 170.0) are assignable to PET, while the others are assignable to EOA Ny-66.

Example 4 [preparation of PBT-g-nylon elastomer polymer]

β-Hydroxyalkylated polyamide (hereinafter abbreviated to "EOA Ny-PAE") prepared by the addition of 5 parts of ethylene oxide to 100 parts of a polyamide elastomer (a product of Daicel-Hüls Ltd.; Daiamid PAE E47) was used as the hydroxylated polyamide.

60 g of dimethyl terephthalate, 58.4 g of 1,2-ethylene glycol, 70 g of EOA NY-PAE and 0.1 g of titanium (IV) tetrabutoxide as a transesterification catalyst were fed into the same equipment as the one used in the Example 1. The contents were heated to 170° C. in a stream of nitrogen under stirring. After 1.5 hours, it was ascertained that a theoretical amount of methanol had been eliminated. The reaction system was evacuated to 3 mmHg with a vacuum pump and heated to 250° C. After 2 hours, it was ascertained that no more 1,4-butanediol was discharged. The reaction system was brought to a normal pressure to give 130.5 g of a PBT-g-nylon elastomer polymer.

In the infrared absorption spectrum of the PBT-g-nylon elastomer polymer, absorption peaks assignable to the amide group of the nylon elastomer were observed at 3300, 1640, and 1550 cm$^{-1}$; an absorption peak assignable to the polyether component of the nylon elastomer was observed at 1120 cm$^{-1}$; and an absorption peak assignable to the ester group of PBT was observed at 1725 cm$^{-1}$. Further, in the $^1$H- and $^{13}$C-NMR spectra thereof, absorption peaks assignable to the PBT component and EOA-NY-PAE were observed.

Example 5 preparation of PBT-g-nylon 12 polymer

β-Hydroxyalkylated polyamide (hereinafter abbreviated to "EOA Ny-12"), prepared by the addition of 5 parts of ethylene oxide to 100 parts of a powder of nylon 12 (a product of Daicel-Hüls Ltd.; Daiamid L2140), was used as the hydroxylated polyamide.

52 g of dimethyl terephthalate, 50.6 g of 1,4-butanediol, 73.5 9 of EOA Ny-12 and 0.1 g of titanium (IV) tetrabutoxide as a transesterification catalyst were fed into the same equipment that was used in Example 1. The contents were heated to 170° C. in a stream of nitrogen under stirring. After 2 hours, it was ascertained that a theoretical amount of methanol had been eliminated. The reaction system was evacuated to 3 mmHg and heated to 250° C. After 2 hours, it was ascertained that no more 1,4-butanediol was discharged. The reaction system was brought to a normal pressure to give 126.2 g of a PBT-g-nylon 12 polymer.

In the infrared absorption spectrum and $^1$H- and $^{13}$C-NMR spectra of the polymer, absorption peaks assignable to the PBT component and EOA Ny-12 were observed.

Experimental Example 1

The molecular weights in terms of PMMA of the polyester-grafted polyamides prepared in the foregoing Examples 1 to 5 were each determined by GPC.

| Conditions of measurement: | |
|---|---|
| equipment | TOSOH-CCPE |
| sensor | RI (UV) |
| eluent | HFIP |
| flow rate | 0.5 ml/min |
| pressure | 10 kg/cm$^2$ |
| temperature | 20° C. |

Figure 4A:
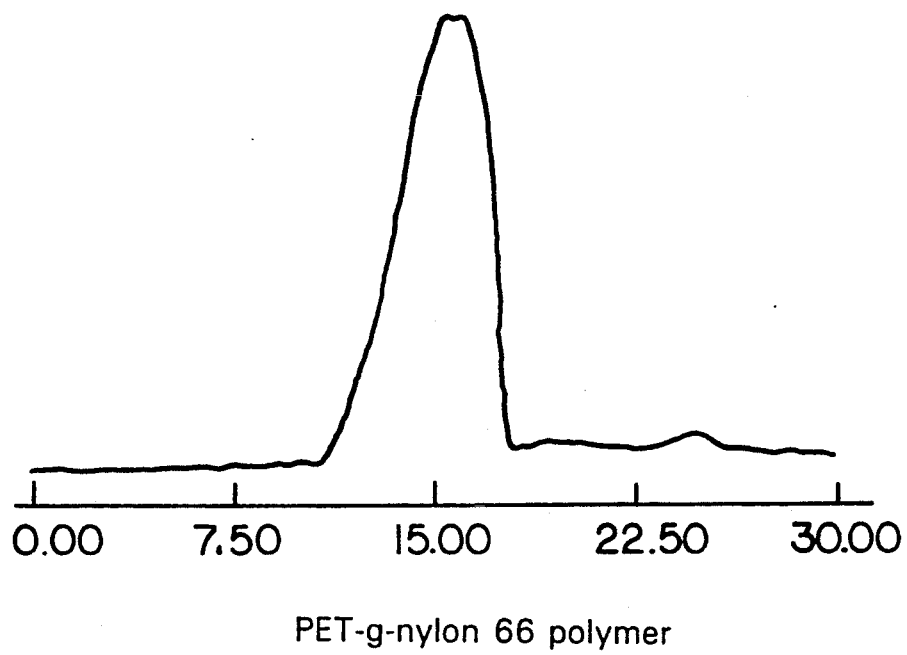
Figure 4B:
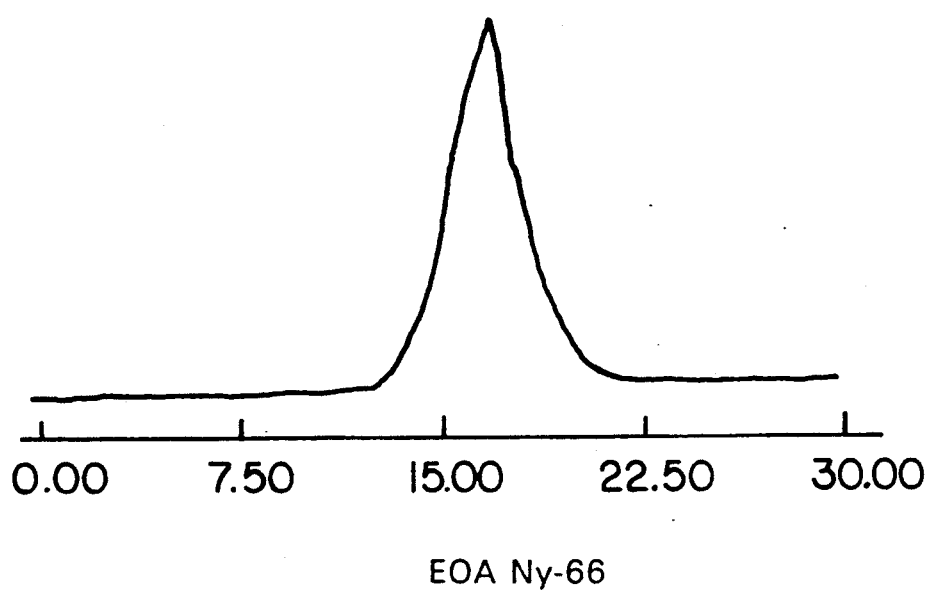

The molecular weights in terms of PMMA of the polyester-grafted polyamides prepared in the Examples 1 to 5 and the polyamides (EOA Nys) used as the raw materials as determined by GPC are gived in Table 1. Further, the gel permeation chromatograms of the PET-g-nylon 66 polymer prepared in the Example 3 and the EOA Ny-66 used as the raw material are shown in FIGS. 4 (a) and (b) respectively.

TABLE 1

Results of Experimental Example 1

| polyester-grafted polyamide | molecular weight in terms of PMMA | polyamide as raw material | molecular weight in terms of PMMA |
|---|---|---|---|
| Ex. 1 | 215,000 | EOA Ny-1 | 133,000 |
| Ex. 2 | 196,000 | EOA Ny-2 | 156,000 |
| Ex. 3 | 168,000 | EOA Ny-66 | 103,000 |
| Ex. 4 | 135,000 | EOA Ny-PAE | 87,000 |
| Ex. 5 | 284,000 | EOA Ny-12 | 187,000 |

The molecular weights in terms of PMMA of the polyester-grafted polyamides prepared in the Examples 1 to 5 are larger than that of the polyamide (EOA Ny) used as the raw material for the preparation thereof, which proves that the grafting of the polyester onto the polyamide has proceeded. Further, no peak was observed on the lower molecular weight side, which means that a low molecular compound such as polyester oligomer is absent.

Preparative Example 1 preparation of PBT-A 43.3 g of dimethyl terephthalate, 42.2 g of butanediol and 0.1 g of titanium (IV) tetrabutoxide as a transesterification catalyst were fed into the same equipment as that used in Example 1. The contents were heated to 180° C. in a stream of nitrogen under stirring. The subsequent steps were conducted in a similar manner to that of Example 1 to give 48 g of a polymer (hereinafter referred to as "PBT-A").

The infrared absorption spectrum and $^1$H- and $^{13}$C-NMR spectra of the polymer were identical with those of a commercially available PBT.

The molecular weight in terms of PMMA of PBT-A as determined by GPC was 25,000 and the GPC peak thereof was nearly identical with that of a commercially available PBT having a number-average molecular weight of 19,000.

PBT-A was used in Experimental Examples 2 and 3 as a sample for the comparison with the polyester-grafted polyamide.

Preparative Example 2 preparation of NB resin 43.3 g of dimethyl terephthalate, 42.2 g of 1,4-butanediol, 73.5 g of nylon 6 powder (P 1022) and 0.1 g of titanium(IV) tetrabutoxide as a transesterification catalyst were fed into the same equipment as that used in the Example 1. The contents were heated to 180° C. in a stream of nitrogen under stirring.

The subsequent steps were conducted in a similar manner to that of the Example 1 to give 113.5 g of a polymer (hereinafter referred to as "NB resin").

NB resin was used in Experimental Examples 2 and 3 as a sample for the comparison with the polyester-grafted polyamide.

Experimental Example 2

The polyester-grafted polyamides prepared in the Examples 1 to 5 and the Comparative Samples were examined for thermal behavior with a differential scanning calorimeter. Each test sample was subjected to DSC (temperature range: from room temperature to 300° C., temperature rise rate: 20° C./min) and the obtained DSC curve was termed the first heat.

The resulting molten sample was cooled at a constant rate of 20° C./min and immediately subjected to DSC (temperature range: from room temperature to 300° C., temperature rise rate: 20° C./min). The obtained DSC curve was termed the Second heat.

The second heat of the PBT-g-nylon 6 polymer (1) prepared in the Example 1 is shown in FIG. 5 (a), while that of the PBT-g-nylon 6 polymer (2) prepared in the Example 2 is shown in FIG. 5 (b). Further, the endothermic peaks ascribable to the fusion of crystals of the polyester-grafted polyamides prepared in the Examples 1 to 5, the polyamides (EOA Nys) used as the raw materials and PBT-A and NB resin used as the comparative samples are given together in Table 2.

As shown in FIG. 5 (a), the PBT-g-nylon 6 polymer (1) exhibits two endothermic peaks, both of which have shifted to the lower temperature side of the fusion peaks of EOA Ny-1 used as the raw material, which is presumably because the melting point of the nylon 6 chain component may be lowered by the grafting of PBT thereonto and the endothermic peak of the PBT chain component may also shift to the lower temperature side thereby, though it ought to be present near 224° C. originally.

As shown in FIG. 5 (b), no endothermic peak assignable to the fusion of crystal of the PBT-g-nylon 6 polymer (2) was observed at all, which is presumably because the crystallization of both the nylon 6 chain component and the PBT chain component may be hindered in the graft polymer comprising both the chain components, i.e. the polymer (2), so that when the polymer (2) is cooled from a molten state at a rate of 20° C./min, it may be solidified before the crystal growth, thus leading to a noncrystalline state. The reason why the DSC curve of the polymer (2) is different from that of the polymer (1) shown in FIG. 5 (a) is thought to be because both the polymers are different from each other in respect of the molecular weight of the PBT chain grafted and the number of PBT chains grafted onto one polyamide chain, so that they may also be different in respect of the degrees of hindrance to crystallization. It was ascertained that PBT-g-nylon 6 polymer (1) also gives a noncrystalline solid when it is cooled from a molten state at a rate of 80° C./min.

TABLE 2

Results of Experimental Example 2

| | Endothermic peaks ascribable to crystallization (°C.) | |
|---|---|---|
| Test sample | first heat | second heat |
| Ex. 1 | 190.8, 208.7 | 185.4, 206.5 |
| Ex. 2 | 79.1, 139.6 | not observed |
| Ex. 3 | 130.6, 187.6 | not observed |

TABLE 2-continued

Results of Experimental Example 2

| Test sample | Endothermic peaks ascribable to crystallization (°C.) | |
|---|---|---|
| | first heat | second heat |
| Ex. 4 | 55.4, 101.2 | not observed |
| Ex. 5 | 158.6, 180.2 | 157.9, 177.5 |
| EOA Ny-1 | 213.5 | 211.8 |
| EOA Ny-2 | 210.2 | 208.5 |
| EOA Ny-66 | 253.9 | 252.4 |
| EOA Ny-PAE | 155.8 | 155.2 |
| EOA Ny-12 | 180.6 | 180.2 |
| PBT-A | 225.2 | 224.4 |
| NB resin | 224.1 | 224.6 |

The above phenomena and results prove that a polyester prepolymer was polymerized from a hydroxylated polyamide to form a polyester-grafted polyamide.

Experimental Example 3

The polyester-grafted polyamides prepared in the Examples 1 to 5, the polyamides (EOA-Nys) used as the raw materials were examined for the crystalline state by wide-angle X-ray diffractometry. The appearances and diffraction peaks of the polyester-grafted polyamides prepared in the Examples 1 to 5 and PBT-A and NB resin as the comparative samples as determined by cooling them in a DSC from a molten state at the rates of 20° C./min and 80° C./min are gived together in Table 3.

Figure 6A:
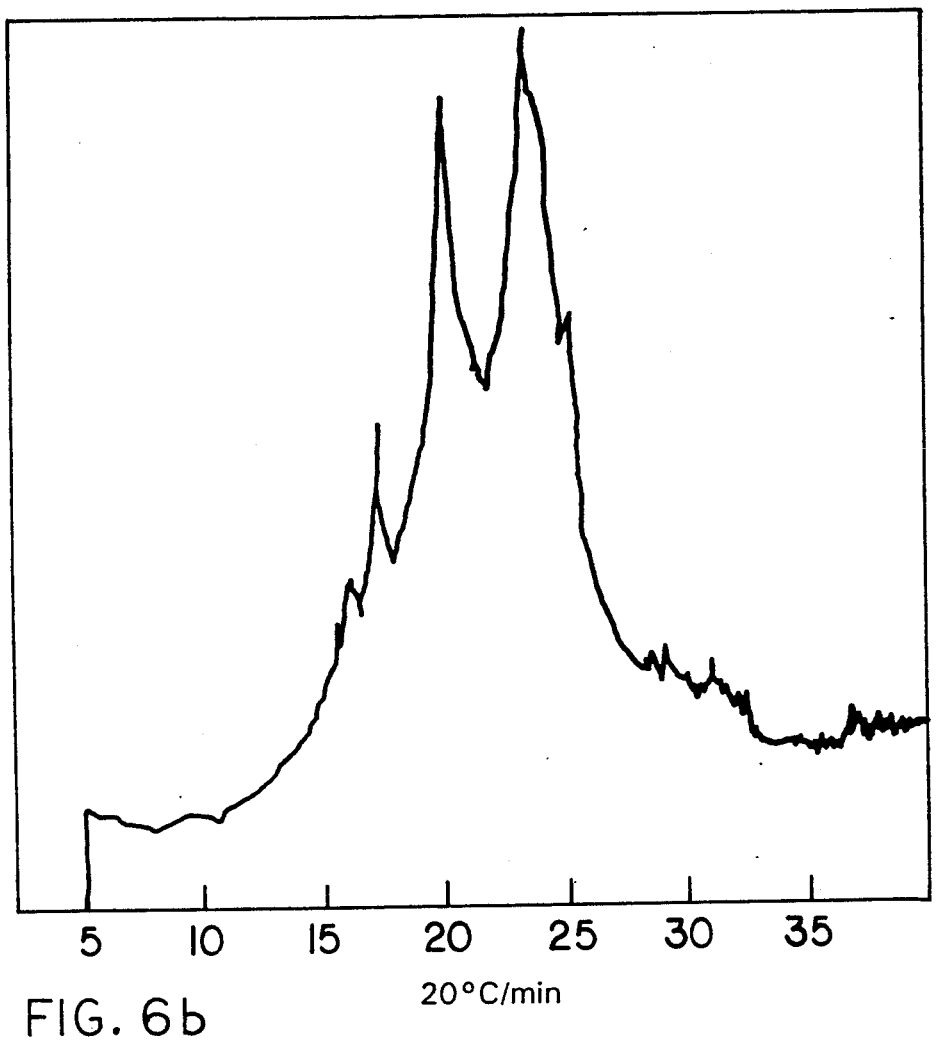
Figure 6B:
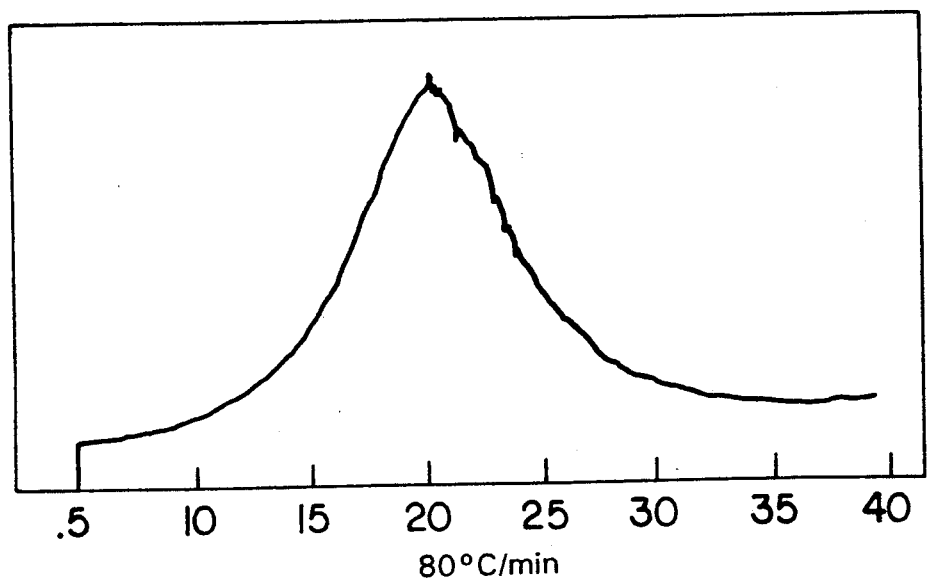

Particularly, the diffraction peaks of the PBT-g-nylon 6 polymer (1) prepared in the Example 1 as determined by cooling it from a molten state at the rates of 20° C./min and 80° C./min are given in FIG. 6 (a) and (b), respectively.

TABLE 3

Results of Experimental Example 3

| | Cooled in DSC at 20° C./min | | Cooled in DSC at 80° C./min | |
|---|---|---|---|---|
| | appearance | crystal diffraction peak 2Θ (deg) | appearance | crystal diffraction peak 2Θ (deg) |
| Ex. 1 | white | 16, 17.5, 20 (20.5), 23.5, 25.5 | transparent | noncrystalline hale |
| Ex. 2 | transparent | non-crystalline hale | transparent | — |
| Ex. 3 | transparent | — | transparent | — |
| Ex. 4 | transparent | — | transparent | — |
| Ex. 5 | white | 16, 17.5, 20, 21.5, 23.5, 25.5 | transparent | — |
| EOA Ny-1 | translucent | 20, 23.5 | translucent | 20, 23.5 |
| EOA Ny-2 | translucent | — | translucent | — |
| EOA Ny-66 | translucent | — | translucent | — |
| EOA Ny-PAE | translucent | 21.5 | translucent | 21.5 |
| EOA Ny-12 | translucent | — | translucent | — |
| PBT-A | white | 16, 17.5, 20.5, 23.5, 25.5 | white | 16, 17.5, 20.5, 23.5, 25.5 |
| NB resin | white | 16, 17.5, 20 (20.5), 23.5, 25.5 | white | 16, 17.5, 20 (20.5), 23.5, 25.5 |

These phenomena and results prove that the polyester was grafted onto the hydroxylated polyamide, by which the rate of crystallization of the amide was lowered.

The polyester-grafted polyamides prepared in a similar manner to that of the Examples 1 to 5 and the following polyamide resins, thermoplastic polyester resins and polycarbonate were used in the following Examples 6 to 18 and Comparative Examples 1 to 10.

(1) polyamide resin
nylon 6 (a product of Ube Industries, Ltd.; Ube Nylon 6, 1013B) hereinafter referred to as "6-nylon"
nylon 66 (a product of Polyplastics Co., Ltd., Polypla Nylon 66, 1000-2) hereinafter referred to as "66-nylon"
nylon 12 (a product of Daicel-Huls Ltd., Daiamid, L 2140) hereinafter referred to as "12-nylon"

(2) thermoplastic polyester resin
polybutylene terephthalate (a product of Polyplastics Co., Ltd., Duranex 400FP) hereinafter referred to as "PBT 400FP"
polyethylene terephthalate (a product of Mitsubishi Rayon Co., Ltd., Dianite MA-523V) hereinafter referred to as "PET 523V"
polyarylate (a product of Unitika Ltd., U Polymer AX-1500) hereinafter referred to as "U Polymer"

(3) polycarbonate (a product of Mitsubishi Gas Chemical Co., Inc., Upilon S-3000) hereinafter referred to as "PC"

EXAMPLES 6 TO 9

The PBT-g-nylon 6 polymer (2) and PBT-g-nylon elastomer polymer prepared in the Examples 2 and 4, 6-nylon and PBT 400FP were mixed at ratios specified in Table 4 on a Henschel mixer at room temperature for 15 minutes. The obtained resin mixtures were each melt-kneaded on a single screw extruder (40 mmΦ) at 240° C. to give pellets. The pellets were molded into predetermined test pieces at 240° C. on a screw injection molding machine. The test pieces thus prepared were examined for tensile strength (test piece No. 1, test temperature: 23° C., rate of pulling: 10 mm/min, hereinafter abbreviated to "TS") and elongation in tension (ditto, hereinafter abbreviated to "EI") according to JIS K 7113, Izod impact strength (thickness of sample: 3.2 mm, test temperature: 23° C., notched, hereinafter abbreviated to "IS") according to JIS K 7110 and heat deformation temperature (thickness of sample: 3.2 mm, flexure stress: 4.6 kgf/cm², unannealed, hereinafter abbreviated to "HDT") according to JIS K 7207.

Comparative Examples 1 and 2

For comparison, PBT 400FP and 6-nylon were each melt-kneaded and injection-molded into a test pieces in a similar manner to that of the Example 6 to 9. The test pieces thus prepared were examined for physical properties in a similar manner to that of the Examples 6 to 9.

The results of the Examples 6 to 9 and Comparative Examples 1 and 2 are given together in Table 4.

TABLE 4

Results of Examples 6 to 9 and Comparative Examples 1 and 2

| | Ex. No. | | | | Comp. Ex. No. | |
|---|---|---|---|---|---|---|
| | 6 | 7 | 8 | 9 | 1 | 2 |
| Resin composition (parts) | | | | | | |
| PBT 400FP | 90 | — | 90 | 80 | 100 | — |
| 6-nylon | — | 90 | — | — | — | 100 |
| PBT-g-nylon 6 polymer (2) | 10 | 10 | — | — | — | — |
| PBT-g-nylon elastomer polymer | — | — | 10 | 20 | — | — |
| Results of test | | | | | | |
| TS (kg/cm²) | 505 | 680 | 480 | 400 | 510 | 650 |
| EI (%) | 150 | >300 | >300 | >300 | 40 | >300 |
| IS (kg · cm/cm²) | 6.8 | 18.7 | 10.0 | 23.2 | 3.0 | 7.0 |
| HDT (°C.) | 154 | 183 | 151 | 145 | 156 | 185 |

EXAMPLES 10 TO 15

The PBT-g-nylon 6 polymer (1), PET-g-nylon 66 polymer, PBT-g-nylon 12 polymer prepared in the Examples 1, 3 and 5, PBT 400FP, PET 523V, 6-nylon, 12-nylon and 66-nylon were mixed at ratios specified in Table 5 on a Henschel mixer at room temperature for 15 minutes. The obtained resin mixtures were each melt-kneaded at 240° to 280° C. on a single-screw extruder (40 mmΦ) to give pellets. The pellets were molded into predetermined test pieces on a screw injection molding machine at 240° to 280° C.

The test pieces thus prepared were examined for physical properties in a similar manner to that of the Examples 6 to 9. The results are given together in Table 5.

Comparative Examples 3 to 7

For comparison, PBT 400FP, PET 523V, 6-nylon, 12-nylon and 66-nylon were mixed at ratios specified in Table 6. The obtained mixtures were each melt-kneaded, injection molded and examined for physical properties in a similar manner to that of the Examples 10 to 15. The results are given together in Table 6.

TABLE 6

Results of Comparative Examples 3 to 7

| | Comp. Ex. No. | | | | |
|---|---|---|---|---|---|
| | 3 | 4 | 5 | 6 | 7 |
| Resin composition (parts) | | | | | |
| PBT 400FP | 70 | 40 | 50 | — | — |
| PET 523V | — | — | — | 70 | 40 |
| 6-nylon | 30 | 60 | — | — | — |
| 12-nylon | — | — | 50 | — | — |
| 66-nylon | — | — | — | 30 | 60 |
| Results of test | | | | | |
| appearance of molded article | | | delamination | | |
| TS (kg/cm²) | 530 | 600 | 410 | 510 | 580 |
| EI (%) | 16 | 190 | 120 | 27 | 130 |
| IS (kg · cm/cm²) | 2.5 | 2.8 | 4.0 | 3.0 | 3.5 |
| HDT (°C.) | 162 | 169 | 150 | 115 | 178 |

EXAMPLES 16 TO 18

The PET-g-nylon 66 polymer prepared in the Example 3, 66-nylon, U Polymer and PC were mixed at ratios

TABLE 5

Results of Examples 10 to 15

| | Ex. No. | | | | | |
|---|---|---|---|---|---|---|
| | 10 | 11 | 12 | 13 | 14 | 15 |
| Resin composition (parts) | | | | | | |
| PBT 400FP | 66.5 | 38 | 47.5 | 47.5 | — | — |
| PET 523V | — | — | — | — | 66.5 | 38 |
| 6-nylon | 28.5 | 57 | — | — | — | — |
| 12-nylon | — | — | 47.5 | 47.5 | — | — |
| 66-nylon | — | — | — | — | 28.5 | 57 |
| PBT-g-nylon 6 polymer (1) | 5 | 5 | 5 | — | — | — |
| PBT-g-nylon 12-polymer | — | — | — | 5 | — | — |
| PET-g-nylon 66 polymer | — | — | — | — | 5 | 5 |
| Results of test | | | | | | |
| appearance of molded article | good | good | good | good | good | good |
| TS (kg/cm²) | 580 | 650 | 430 | 450 | 540 | 640 |
| EI (%) | 46 | >300 | >300 | >300 | >300 | >300 |
| IS (kg · cm/cm²) | 3.9 | 11.3 | 5.0 | 8.1 | 4.4 | 8.4 |
| HDT (°C.) | 162 | 171 | 153 | 152 | 120 | 180 | specified in Table 7 on a Henschel mixer at room temperature for 15 minutes. The obtained resin mixtures were each melt-kneaded on a single-screw extruder (40 mm$\phi$) at 280° C. to give pellets. The pellets were molded into predetermined test pieces on a screw injection molding machine at 280° C.

The test pieces thus prepared were each examined for physical properties in a similar manner to that of the Examples 6 to 9.

Comparative Examples 8 to 10

For comparison, 66-nylon, U Polymer and PC were mixed at ratios specified in Table 7. The obtained mixtures were each melt-kneaded, injection molded and examined for physical properties in a similar manner to that of the Examples 16 to 18. The results of the Examples 16 to 18 and Comparative Examples 8 to 10 are given together in Table 7.

TABLE 7

Results of Examples 16 to 18 and Comparative Examples 8 to 10

| | Ex. No. | | | Comp. Ex. No. | | |
|---|---|---|---|---|---|---|
| | 16 | 17 | 18 | 8 | 9 | 10 |
| 66-nylon | 38 | 57 | 38 | 40 | 60 | 40 |
| U Polymer | 57 | 38 | — | 60 | 40 | — |
| PC | — | — | 57 | — | — | 60 |
| PET-g-nylon 66 polymer | 5 | 5 | 5. | — | — | — |
| | | Results of test | | | | |
| appearance of molded article | | good | | delamination | | slight delamination |
| TS (kg/cm$^2$) | 770 | 780 | 700 | 730 | 750 | 670 |
| EI (%) | 84.5 | >300 | >300 | 14 | 18 | 14 |
| IS (kg · cm/cm$^2$) | 19.2 | 14.3 | 17.8 | 4.6 | 3.6 | 3.0 |
| HDT (°C.) | 184 | 189 | 159 | 186 | 188 | 157 |

We claim:

1. A polyester-grafted polyamide comprising a polyamide as the backbone and a thermoplastic polyester as the graft, said polyester-grafted polyamide having a number-average molecular weight of 50,000 to 500,000 as determined by gel permeation chromatography using polymethyl methacrylate as a standard and using 1,1,1,3,3,3-hexafluoro-2-propanol as an eluent.

2. The polyester-grafted polyamide as claimed in claim 1, which has a structure represented by the following formula I or II:

X stands for a hydrogen atom, a hydro-carbon group or a halogen atom; R stands for an alkylene group having 2 to 6 carbon atoms; R$^1$ stands for an alkylene group having 4 to 8 carbon atoms, m-xylylene group or a phenylene group; R$^2$ stands for an alkylene group having 4 to 14 carbon atoms; R$^3$ stands for an alkylene group having 2 to 4 carbon atoms; l is a positive number of 1 to 1,000; m is a positive number of 1 to 10; n$_1$ and n$_2$ are each a number of 0 to 50; n$_3$ and n$_4$ are each a number of 0 to 500, with the proviso that the relationships: n$_1$+n$_2$=0 and n$_1$×n$_2$+n$_2$×n$_4$=0 must be satisfied; and Z stands for a terminal group of a thermoplastic polyester or a hydrogen atom, said polyester grafted polyamide having a number-average molecular weight of 50,000 to 500,000 as determined by gel permeation chromatography using polymethyl methacrylate as a standard and using 1,1,1,3,3,3-hexafluoro-2-propanol as an eluent.

3. A process for preparing a polyester-grafted polyamide which comprises polycondensing at least one member selected from the group consisting of dibasic acids and ring alkylated, halogenated, ester and acid halide derivatives of said dibasic acids with at least one member selected from the group consisting of glycols and dihydric phenols in the presence of a hydroxylated polyamide.

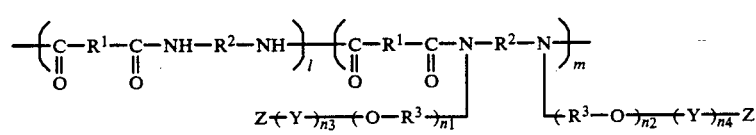

I

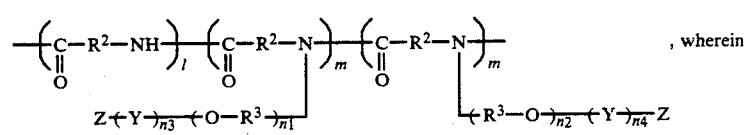

II

, wherein

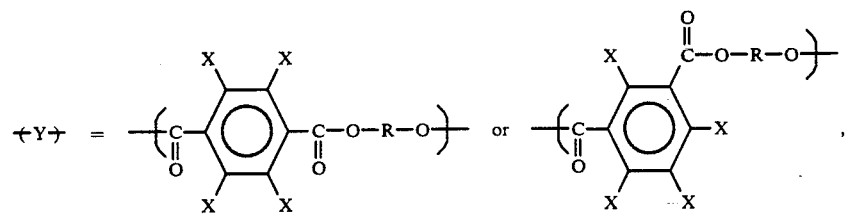

4. A process for preparing a polyester-grafted polyamide comprising, polymerizing at least one polyester prepolymer represented by the following formula III or IV:

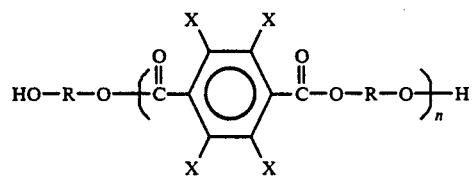
III

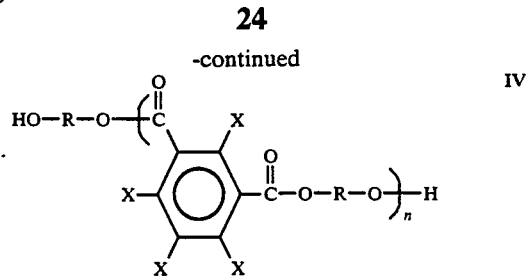
IV wherein X stands for a hydrogen atom, a hydrocarbon group or a halogen atom; R stands for an alkylene group having 2 to 6 carbon atoms; and n is a positive number of 1 to 200, in the presence of a hydroxylated polyamide through transesterification.

* * * * *